United States Patent [19]

Furukawa et al.

[11] Patent Number: 5,290,634
[45] Date of Patent: Mar. 1, 1994

[54] ANTISTATIC FILM

[75] Inventors: Akira Furukawa; Hidetsugu Oda, both of Tsukuba, Japan

[73] Assignee: Mitsubishi Paper Mills Limited, Tokyo, Japan

[21] Appl. No.: 649,963

[22] Filed: Feb. 4, 1991

[30] Foreign Application Priority Data

| | | | |
|---|---|---|---|
| Feb. 5, 1990 | [JP] | Japan | 2-026442 |
| Aug. 3, 1990 | [JP] | Japan | 2-206324 |
| Aug. 3, 1990 | [JP] | Japan | 2-206325 |
| Aug. 3, 1990 | [JP] | Japan | 2-206326 |
| Aug. 3, 1990 | [JP] | Japan | 2-206327 |

[51] Int. Cl.$^5$ ............... B32B 27/36; C08F 12/36
[52] U.S. Cl. ............... 428/475.2; 428/478.2; 428/483; 428/522; 428/922; 526/287
[58] Field of Search ............... 526/287; 428/475.2, 428/522, 922, 483

[56] References Cited

U.S. PATENT DOCUMENTS

| | | |
|---|---|---|
| 4,225,665 | 9/1980 | Schmidt, III . |
| 4,301,239 | 11/1981 | Miller . |
| 4,585,730 | 4/1986 | Cho . |
| 4,701,239 | 10/1987 | Miller . |

FOREIGN PATENT DOCUMENTS

| | | | |
|---|---|---|---|
| 0149077 | 6/1981 | Fed. Rep. of Germany | 428/922 |
| 1401892 | 4/1965 | France . | |
| 56-92535 | 7/1198 | Japan . | |
| 4836289 | 11/1973 | Japan . | |
| 55-84658 | 6/1980 | Japan . | |
| 61-174542 | 8/1986 | Japan . | |
| 61-174543 | 8/1986 | Japan . | |
| 2075208A | 11/1981 | United Kingdom | 428/922 |

OTHER PUBLICATIONS

Kaizuka, "Antistatic Agent", Patent Abstracts of Japan, vol. 13, No. 105, Mar. 13, 1989.

Primary Examiner—P. C. Sluby
Attorney, Agent, or Firm—Cushman, Darby & Cushman

[57] ABSTRACT

The present invention provides a curable antistatic agent polymer excellent in water resistance which is obtained by polymerizing a mixture of polymerizable monomer components comprising two components of a polymerizable vinyl monomer (I) having a sulfonic acid group or a salt thereof as a substituent and a monomer (II) represented by the following formula (II) or a mixture of these two components and an additional polymerizable monomer component in a water-miscible organic solvent or a mixed solvent comprising a water-miscible organic solvent and water in the presence or absence of a resin soluble in said solvent:

$$CH_2=\overset{R^1}{\underset{|}{C}}-CO-\overset{R^2}{\underset{|}{N}}-CH_2OR^3$$

wherein $R^1$ and $R^2$ each represents a hydrogen atom or a methyl group and $R^3$ represents a hydrogen atom or an alkyl group of 1 to 8 carbon atoms.

13 Claims, No Drawings

ANTISTATIC FILM

BACKGROUND OF THE INVENTION

The present invention provides a material usable as antistatic agent for film. Since it is excellent in transparency and water resistance, when it is coated, for example, on the surface of support of film photosensitive materials, there is provided good antistatic properties before and after development treatment without giving adverse effects on the characteristics of photosensitive materials and thus, this antistatic agent can be suitably used for general film photosensitive materials which utilize silver salts.

Hitherto, various antistatic agents have been available. Some of them can exhibit antistatic properties of a certain degree at the stage before development treatment by introducing them, for example, into gelatin which constitutes photosensitive materials, but these are all poor in water resistance and when they are merely mixed with gelatin and the mixture is coated and dried, they usually fall away from the photosensitive materials after subjected to development.

Importance of antistatic agent in photosensitive materials is inhibition of generation of static marks, troubles in conveyance caused by static sticking of the photosensitive materials, and statical sticking of dusts before development. Similarly, for films after subjected to development, if no antistatic agent is present, there may be also serious problems such as defects in images caused by sticking of dusts in contact printing to PS plate in the case of films for plate making.

In an attempt to solve these problems by providing an antistatic layer having water resistance, a method has been proposed for enhancing water resistance of antistatic film by adding a polyfunctional aziridine to an antistatic polymer into which a carboxyl group is introduced and crosslinking them as disclosed in Japanese Patent Kokai (Laid-Open) Nos. Sho 55-84658, 56-92535, 61-174542, and 61-174543. However, aziridine compound is unstable and, when added to a coating solution, causes change of properties of the coating solution with time and besides, the compound has the problem of toxicity. Thus, this compound has various difficulties in use at the production site.

Furthermore, effects of the antistatic agent on characteristics of photosensitive materials are also important and direct introduction of antistatic agent in photosensitive layer often causes reduction of sensitivity and fogging of background.

SUMMARY OF THE INVENTION

Under the circumstances, an object of the present invention is to provide an antistatic agent which is superior in water resistance and has good antistatic action both before and after usual photographic development and to solve various trouble caused by generation of static electricity before and after development treatment without adversely affecting the characteristics of photosensitive materials by providing a layer containing the above antistatic agent in the film photosensitive materials. Another object is to stabilize the properties of coating solution in preparation thereof by improving stability of the antistatic agent per se.

In case of introducing a compound having antistatic action alone or in combination with water-soluble polymer such as gelatin as an antistatic layer, it is difficult to realize antistatic action before and after development as aimed at by the present invention unless water resistance of the antistatic agent per se is enhanced. As is clear from their chemical skeleton, since so-called antistatic agents have hydrophilic structure, especially low molecular compounds are usually high in water-solubility and poor in water resistance. On the other hand, in the case of high molecular compounds, it has been found that it is possible to balance antistatic properties and water resistance by containing a component having the similar hydrophilic structure in polymer skeleton and by introducing a heat curable substituent as copolymerization component for enhancing water resistance. As a result, the present invention has been accomplished. The inventors have succeeded in providing a stable antistatic agent which shows excellent antistatic action and simultaneously has good water resistance resulting from heat curing in formation of film by introducing a functional group having a high antistatic action as a substituent in polymer skeleton and besides, by stably introducing a heat curable group into the polymer without causing heat curing during polymerization.

That is, the present invention is a curable antistatic agent polymer dispersion obtained by polymerizing a mixture of polymerizable monomer components comprising two components of a polymerizable vinyl monomer (I) having a sulfonic acid group or a salt thereof as a substituent and a monomer (II) represented by the following formula (II) with or without additional polymerizable monomer components in a water-miscible organic solvent or a mixed solvent comprising a water-miscible organic solvent and water in the presence or absence of a resin soluble in said solvent:

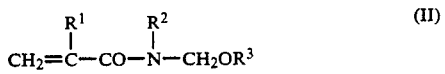

(wherein $R^1$ and $R^2$ each represents a hydrogen atom or a methyl group and $R^3$ represents a hydrogen atom or an alkyl group of 1 to 8 carbon atoms).

DESCRIPTION OF THE INVENTION

As examples of the above monomer (I), mention may be made of p-styrenesulfonic acid and its alkali metal salts and ammonium salts, 2-acrylamide-2-methylpropanesulfonic acid and its alkali metal salts, ammonium salts and neutralized salts with organic amines, and sodium 2-sulfoethyl(meth)acrylates.

As examples of the above monomer (II), mention may be made of hydroxymethyl(meth)acrylamide, ethoxymethyl(meth)acrylamide, and butoxymethyl(meth)acrylamide. From the point of heat curability, hydroxymethyl(meth)acrylamides are especially preferred because they give good crosslinked film under relatively gentle conditions.

Proportions of the monomer (I) and the monomer (II) to total polymerizable monomers are preferably at least 40% by weight, especially 40-90% by weight of (I) and at least 10% by weight, especially 10-60% by weight of (II) from the points of antistatic properties and water resistance of the resulting film.

In addition to the above monomers (I) and (II), various monomers may be introduced as a third copolymerizable component. In this case, the third monomer is not critical and any monomers can be used as far as they are copolymerizable with the monomer (I) or (II). For example, there may be used styrene and derivatives thereof, (meth)acrylic acids and various ester derivatives thereof, (meth)acrylamides and derivatives thereof, acrylonitrile, crotonic acid, maleic acid, divinylbenzene, ethylene glycol di(meth) acrylates, methylenebisacrylamide and other various monomers.

It has been found that especially, heat curability of the resulting polymer is improved when monomers having acidic group and polymerizable double bond in their molecule are used as the third monomer other than the monomers (I) and (II). Preferable examples thereof are monomers having carboxylic acid group such as (meth)acrylic acid, crotonic acid and maleic acid and monomers having sulfonic acid group such as 2-acrylamide-2-methylpropanesulfonic acid and vinylsulfonic acid. It is preferred to introduce such monomer in an amount of 1-30% by weight into copolymer.

When polymerization of the above monomers (I) and (II) is carried out in aqueous solution, the whole solution usually gels after a while from starting of polymerization. Especially, when the polymerization is carried out with practically at least 20% by weight of monomer concentration, the whole system gels far before completion of the polymerization and there is usually obtained one which cannot be used as a coating solution. If proportion of monomer (II) is reduced in order to inhibit gelation during polymerization, heat curability of the resulting polymer decreases and sufficient water resistance cannot be obtained. In order to exhibit excellent water resistance aimed at by the present invention, it is necessary that proportion of monomer (II) is at least 10% by weight for the total polymerizable monomers and it has been very difficult to obtain polymers having such composition in the form of solution by usual aqueous solution polymerization.

According to the present invention, it has been found that the polymer can be obtained as particles or as a dispersion and gelation of the whole system can be prevented by using a mixed solvent comprising water and a water-miscible organic solvent as a polymerization solvent in carrying out polymerization with the above mentioned monomer composition. That is, a polymer containing a large amount of heat curable substituent without gelling is obtained by precipitating the produced polymer in the form of particles during polymerization to protect the heat curable substituent inside the particles and by inhibiting crosslinking reaction between particles. According to such process, for example, a polymer containing 90% by weight or more of monomer (II) can be obtained without formation of gel, but it is preferred to copolymerize monomer (I) in an amount of at least 40% by weight in order to exhibit the desired antistatic properties.

As the water-miscible organic solvent, especially preferred are alcohols such as methanol, ethanol, isopropanol, and butanol. In addition, there may be used various organic solvents, for example, ketones such as methyl ethyl ketone and acetone, dioxane, and tetrahydrofuran. Proportion of the water-miscible organic solvent and water is set within the range in which it dissolves monomers (I) and (II) and besides, it is important to use a mixing ratio at which the resulting polymer is at least partially insolubilized. That is, when the proportion of the organic solvent is too much, either one of monomer (I) and monomer (II) cannot be completely dissolved and due to heterogeneousness from the beginning of polymerization, the polymerization often does not smoothly proceed and this is not preferred. On the other hand, when amount of organic solvent is too small, since the resulting polymer is soluble, gradually the polymerization and heat curing reaction of the heat curable monomer (II) proceed in parallel resulting in gelation of the whole system. Therefore, it is important to select such a solvent mixing ratio that the monomer mixture is dissolved and the resulting polymer is insolubilized.

A water/alcohol mixed solvent containing alcohol at a concentration of at least 40% is the most preferred in the present invention.

It is possible to precipitate the resulting polymer in the form of particles by the above process, but stability of the produced particles can be further enhanced by allowing a resin soluble in said solvent to be present in the system previously before starting of polymerization. The action of the resin soluble in the solvent in this case is to be adsorbed onto the surface of particles to form an adsorbed protective layer on the particles, thereby to inhibit coalescence of the particles and crosslinking reaction between particles brought about by the coalescence and thus formation of agglomerates is inhibited and production of uniform stable particles can be attained.

In some case, the resin soluble in the solvent as so-called dispersion stabilizer is preferably used in a minimum amount necessary to stably form the particles. Especially, when a dispersion stabilizer such as polyvinyl alcohol is used in a large amount, adhesion properties of the resulting film may decrease. From such point of view, it is preferred to use the resin soluble in the solvent normally in an amount of less than about 10% by weight based on the weight of all other monomers.

As examples of the resin soluble in the solvent, mention may be made of polyvinyl pyrrolidone, polyvinyl acetate, partially saponified polyvinyl acetate, polyvinyl alcohol, and poly(meth)acrylic acid.

By the above-mentioned process, a polymer having heat curable substituent can be obtained as particles or dispersion, but uniform solution of the polymer can be obtained by further adding water after completion of the polymerization to dissolve the polymer. By forming the solution, there is no need to consider dispersion stability of polymer particles or polymer dispersion and this is practically more preferred. It has further been found that the polymer produced by the above-mentioned process has markedly high storage stability in spite of the fact that the polymer contains a large amount of unreacted heat curable group in the molecule. That is, it has been found that since stability of the polymer in the solution is very high, pot life as a coating solution is also very long and, on the other hand, since the polymer contains heat curable group as unreacted, curability is very good when coated on a support such as a film and dried.

The antistatic agent obtained according to the present invention alone or in admixture with gelatin or other water-soluble polymers can be formed into a film. The antistatic layer may be formed at optional positions among various layers which constitute the photosensitive materials. For example, it can be formed above emulsion layer, below emulsion layer or as a back coat on the side of support opposite the side on which the emulsion layer is present or in any of other forms.

The antistatic layer may further contain additives for various purposes. For example, silica fine particles or polymer fine particles may be added as a matting agent for inhibition of blocking or metal fine particles such as tinoxide may be added as other electrically conductive component.

The heat curable antistatic agent obtained in the present invention alone or together with other components is formed into a film on a support such as film and is completely cured, for example, in several hours under heating condition of about 50° C., but the curing speed can further be increased by adding a small amount of acids such as sulfuric acid, hydrochloric acid, phosphoric acid and p-toluenesulfonic acid as a curing catalyst.

When the curable antistatic agent polymer of the present invention contains the monomer (II) represented by the aforementioned formula in an amount of 20% by weight or more based on all polymerizable monomers and when a hydrophilic solution containing this polymer at a concentration of 20% by weight or less and having a pH of 4 or less is applied as a coating solution, the coating solution is stable for a long o period of time and when it is coated on a support and dried, curing thereof rapidly proceeds to give a good water resistant film.

Furthermore, when a layer containing gelatin is provided contiguous to the layer containing the curable antistatic agent polymer of the present invention, adhesion to the support can be enhanced and defects hardly occur on the surface of the antistatic layer and handleability of the photosensitive material is improved. In this case, when the curable antistatic agent polymer of the present invention contains a monomer unit having the aforementioned acidic group in its molecule, more preferred results are obtained.

The following nonlimiting examples will show preparation of the antistatic agent of the present invention and effects obtained by applying the resulting antistatic agent to photographic photosensitive materials.

PREPARATION EXAMPLE 1

Eight grams of polyvinyl alcohol (PVA 105, saponification degree 98.5%, manufactured by Kuraray Co., Ltd.), 70 g of sodium p-styrenesulfonate and 30 g of N-hydroxymethylacrylamide were charged in a 500 ml four-necked flask provided with a stirrer, a thermometer, a nitrogen introduction pipe, and a reflux condenser and 150 g of ethanol and 150 g of distilled water were added thereto and dissolution was carried out at 70° C.. Polymerization was initiated by adding 1 g of AIBN at 75° C. under nitrogen atmosphere and stirring was carried out at this temperature for 2.5 hours. The product was a white emulsion and this was thrown into water to obtain a homogeneous polymer solution of 15% in solid content. Molecular weight of the product was about 1,000,000 and viscosity in aqueous solution was 30 cps.

COMPARATIVE PREPARATION EXAMPLE

Polymerization was carried out in the same manner as in Preparation Example 1 except that 350 g of distilled water was added as a polymerization medium and ethanol was not used. Gelation proceeded immediately after starting of polymerization and only a solid gel was obtained.

PREPARATION EXAMPLE 2

As in Preparation Example 1, 3 g of polyvinyl alcohol (PVA 117, saponification degree 98.5%, manufactured by Kuraray Co., Ltd.), 55 g of potassium p-styrenesulfonate, 10 g of acrylamide, 5 g of methacrylic acid and 30 g of ethoxymethylmethacrylamide were dissolved in 200 g of distilled water and 150 g of isopropanol at 70° C. and 0.8 g of AIBN was added thereto at 75° C., followed by stirring with heating for 3 hours under nitrogen atmosphere.

After completion of the polymerization, to the resulting dispersion was added distilled water to prepare a 15% solution.

PREPARATION EXAMPLE 3

As in Preparation Example 1, 5 g of polyvinyl alcohol (PVA KL118, saponification degree 97.5%, manufactured by Kuraray Co., Ltd.), 50 g of sodium 2-acrylamide-2-methylpropanesulfonate, 40 g of N-hydroxymethylacrylamide, 2 g of acrylic acid and 10 g of styrene were dissolved in 160 g of distilled water, 100 g of ethanol and 50 g of 1,4-dioxane, and 0.7 g of AIBN was added thereto at 75° C., followed by stirring with heating for 2 hours under nitrogen atmosphere.

The resulting dispersion was diluted with distilled water to obtain a homogeneous solution of 15% in concentration.

PREPARATION EXAMPLE 4

As in Preparation Example 1, 5 g of polyvinyl alcohol (PVA 103, saponification degree 98.6%, manufactured by Kuraray Co., Ltd.), 55 g of sodium p-styrenesulfonate, 5 g of 2-acrylamide-2-methylpropanesulfonic acid, 30 g of N-hydroxymethylacrylamide and 10 g of methyl methacrylate were added to 200 g of distilled water and 170 g of methanol and then, 1 g of ammonium persulfate was added thereto at 60° C., followed by stirring for 20 hours at this temperature under nitrogen atmosphere. Then, distilled water was added thereto at room temperature to obtain a solution of 15% in concentration.

EXAMPLE 1

Each of the samples obtained in Preparation Examples 1–4 and Comparative Preparation Example wa coated at a coating film thickness of about 1 micron on both sides of a polyester film subjected to an aqueous subbing treatment and was dried. Drying was carried out by heating at 50° C. for 4 hours.

On this film subjected to the antistatic treatment was coated at a coating amount of 5 g/m$^2$ an emulsion layer prepared by subjecting to desalting treatment a monodispersed silver chlorobromide emulsion of 0.2$\mu$ in average particle size containing 98 mol % of silver chloride which was subjected to usual physical ripening and then adding to the emulsion 5 mg/molAg of pinakryptol yellow as an organic desensitizer, and besides, an aqueous gelatin solution, a hardener, and a surface active agent and then, this coated emulsion layer was dried. The resulting sample was exposed by a roomlight printer and further subjected to development, fixation and washing with water.

Surface resistivity of the surface on which emulsion layer was not provided was measured before and after the development and the results are shown in Table 1. The photosensitive materials coated with the samples obtained in Preparation Examples 1–4 had low surface resistivity even after development treatment and thus, good antistatic properties were exhibited. On the other hand, the sample obtained in Comparative Preparation Example had low proportion of heat curable group and sufficiently cured film was not formed.

TABLE 1

| Antistatic agent | Surface resistivity (Ω) (20° C., 65%) | |
| --- | --- | --- |
| | Before development | After development |
| Preparation Example 1 | $4 \times 10^8$ | $4 \times 10^8$ |
| Preparation Example 2 | $3 \times 10^8$ | $3 \times 10^8$ |
| Preparation Example 3 | $2 \times 10^8$ | $4 \times 10^8$ |
| Preparation Example 4 | $4 \times 10^8$ | $9 \times 10^8$ |

EXAMPLE 2

Each of the samples obtained in Preparation Examples 1–4 was coated at a coating film thickness of about 1 micron on one side of a polyester film subjected to aqueous subbing treatment and was dried.

Thereon was further coated a coating solution comprising an aqueous gelatin solution containing 10% of the same antistatic agent as in the previously coated layer and a hardener and this was dried. On the back side (another side) of the thus obtained film was coated the same emulsion layer as in Example 1 and was dried. This photosensitive material was exposed by a roomlight printer and was subjected to development, fixation and washing with water. Surface resistivity of the antistatic layer was measured before and after the development. The results are shown in Table 2. It can be seen that the antistatic agents obtained in Preparation Examples 1–4 give good antistatic layers excellent in water resistance.

TABLE 2

| Antistatic agent | Surface resistivity (Ω) (20° C., 65%) | |
| --- | --- | --- |
| | Before development | After development |
| Preparation Example 1 | $3 \times 10^9$ | $3 \times 10^9$ |
| Preparation Example 2 | $4 \times 10^9$ | $4 \times 10^9$ |
| Preparation Example 3 | $3 \times 10^9$ | $8 \times 10^9$ |
| Preparation Example 4 | $2 \times 10^9$ | $8 \times 10^9$ |

EXAMPLE 3

Each of the samples obtained in Preparation Examples 1–4 was added to 25% in weight ratio of 10% aqueous polyvinyl alcohol solution to obtain a coating solution. In the same manner as in Example 1, this coating solution was coated on a polyester film subjected to aqueous subbing treatment and was dried and furthermore, the same emulsion layer as in Example 1 was provided. Surface resistivity before and after the development was measured to obtain $10^8$ Ω which changed little before and after the development.

PREPARATION EXAMPLE 5

Seven grams of polyvinyl pyrrolidone, 70 g of sodium p-styrenesulfonate and 30 g of N-methylolacrylamide were charged in a 500 ml four-necked flask provided with a stirrer, a thermometer, a nitrogen introduction pipe, and a reflux condenser and, then 200 g of ethanol and 100 g of distilled water were added thereto and dissolution was carried out at 70° C.. Polymerization was initiated by adding 1 g of AIBN at 75° C. under nitrogen atmosphere to obtain a white emulsion.

After lapse of 3 hours from starting of the polymerization, ethanol was removed by distillation under reduced pressure to obtain a homogeneous aqueous polymer solution of low viscosity.

COMPARATIVE PREPARATION EXAMPLE

Polymerization was carried out in the same manner as in Preparation Example 5 except that 300 g of distilled water was added as a polymerization medium and ethanol was not used. Gelation proceeded immediately after starting of polymerization and only a solid gel was obtained.

PREPARATION EXAMPLE 6

As in Preparation Example 5, 7 g of polyvinyl pyrrolidone, 70 g of sodium p-styrenesulfonate, 30 g of N-methylolacrylamide, and 5 g of 2-acrylamide-2-methylpropanesulfonic acid were dissolved in a mixed solvent comprising 150 g of ethanol and 150 g of distilled water at 70° C. and polymerization was started by adding 1.0 g of AIBN at 75° C. under nitrogen atmosphere. Immediately after starting of the polymerization, a white polymer fine particle was precipitated to result in a semi-opaque emulsion. After about 1 hour from starting of the polymerization, 50 g of ethanol was added, followed by further stirring with heating for about 2 hours.

Thereafter, ethanol was removed by distillation under reduced pressure to obtain a homogeneous aqueous solution.

PREPARATION EXAMPLE 7

As in Preparation Example 5, 7 g of polyvinyl pyrrolidone, 70 g of sodium p-styrenesulfonate, 25 g of N-methylolacrylamide, and 5 g of methacrylic acid were dissolved in 200 g of ethanol and 100 g of distilled water and polymerization was started by adding 1.0 g of AIBN at 75° C.

The product was a stable emulsion of 1 micron or less in particle size.

PREPARATION EXAMPLE 8

As in Preparation Example 5, 10 g of polyvinyl alcohol (PVA 203, partially saponified polyvinyl acetate, manufactured by Kuraray Co., Ltd.), 70 g of sodium p-styrenesulfonate, 30 g of N-methylolacrylamide, and 5 g of 2-acrylamide-2-methylpropanesulfonic acid were dissolved in a mixed solvent comprising 150 g of ethanol and 150 g of distilled water.

Polymerization was started by adding 1.0 g of AIBN at 75° C. under nitrogen atmosphere and further, 50 g of ethanol was added dropwise thereto over a period of 3 hours to stabilize the emulsion produced.

Thereafter, ethanol was removed by distillation under reduced pressure to obtain a homogeneous aqueous solution.

EXAMPLE 4

Each of the samples obtained in Preparation Examples 5–8 and Comparative Preparation Example was coated at a coating film thickness of about 1 micron on both sides of a polyester film subjected to an aqueous subbing treatment and was dried. Drying was carried out by heating at 50° C. for 4 hours.

On this film subjected to the antistatic treatment was coated at a coating amount of 5 gm² an emulsion layer prepared by subjecting to desalting treatment a monodispersed silver chlorobromide emulsion having an average particle size of 0.2μ, containing 98 mol % of silver chloride and subjected to usual physical ripening and then adding to this emulsion 5 mg/molAg of pinakryptol yellow as an organic desensitizer, and besides, an aqueous gelatin solution, a hardener, and a surface active agent and then, this coated emulsion layer was dried. The resulting photosensitive material was exposed by a roomlight printer and further subjected to development, fixation and washing with water.

Surface resistivity of the side on which emulsion layer was not provided was measured before and after the development and the results are shown in Table 3. The photosensitive materials coated with the samples obtained in Preparation Examples 5-8 had low surface resistivity even after development treatment and thus, good antistatic properties were exhibited. On the other hand, the sample obtained in Comparative Preparation Example contained low proportion of heat curable group and sufficiently cured film was not formed.

TABLE 3

| Antistatic agent | Surface resistivity ($\Omega$) (20° C., 65%) | |
| --- | --- | --- |
| | Before development | After development |
| Preparation Example 5 | $2 \times 10^7$ | $3 \times 10^7$ |
| Preparation Example 6 | $2 \times 10^7$ | $2 \times 10^7$ |
| Preparation Example 7 | $3 \times 10^7$ | $2 \times 10^7$ |
| Preparation Example 8 | $2 \times 10^7$ | $2 \times 10^7$ |

EXAMPLE 5

Each of the samples obtained in Preparation Examples 5-8 coated at a coating film thickness of about 1 micron on one side of a polyester film subjected to aqueous subbing treatment and was dried.

Thereon was further coated a coating solution comprising an aqueous gelatin solution containing 10% of the same antistatic agent as in the previously coated layer and a hardener and this was dried. On the back side (another side) of the thus obtained film was coated the same emulsion layer as in Example 4 and was dried. This photosensitive material was exposed by a roomlight printer and was subjected to development, fixation and washing was water. Surface resistivity of the antistatic layer was measured before and after the development. The results are shown in Table 4. It can be seen that the antistatic agents obtained in Preparation Examples 5-8 give good antistatic layers excellent in water resistance.

TABLE 4

| Antistatic agent | Surface resistivity ($\Omega$) (20° C., 65%) | |
| --- | --- | --- |
| | Before development | After development |
| Preparation Example 5 | $3 \times 10^8$ | $5 \times 10^8$ |
| Preparation Example 6 | $4 \times 10^8$ | $5 \times 10^8$ |
| Preparation Example 7 | $3 \times 10^8$ | $6 \times 10^8$ |
| Preparation Example 8 | $2 \times 10^8$ | $2 \times 10^8$ |

EXAMPLE 6

To each of the samples obtained in Preparation Examples 5-8 was added 25% in weight ratio of 10% aqueous polyvinyl alcohol solution to obtain a coating solution. In the same manner as in Example 4, this coating solution was coated on a polyester film subjected to aqueous subbing treatment and was dried and furthermore, the same emulsion layer as in Example 4 was provided. Surface resistivity before and after the development was measured to obtain $10^8 \Omega$ which changed little before and after the development.

PREPARATION EXAMPLE 9

Seventy grams of sodium p-styrenesulfonate and 30 g of N-hydroxymethylacrylamide were charged in a 500 ml four-necked flask provided with a stirrer, a thermometer, a nitrogen introduction pipe, and a reflux condenser and 150 g of ethanol and 100 g of distilled water were added thereto and dissolution was carried out at 70° C.. Polymerization was initiated by adding 1 g of AIBN at 75° C. under nitrogen atmosphere and stirring was carried out at this temperature for 2.5 hours. The product was a white emulsion and this was thrown into water to obtain a homogeneous polymer solution of 15% in solid content. Molecular weight of the product was about 1,000,000 and viscosity in aqueous solution was 40 cps.

COMPARATIVE PREPARATION EXAMPLE

Polymerization was carried out in the same manner as in Preparation Example 9 except that 350 g of distilled water was added as a polymerization medium and ethanol was not used. Gelation proceeded immediately after starting of polymerization and only a solid gel was obtained.

PREPARATION EXAMPLE 10

As in Preparation Example 9, 55 g of potassium p-styrenesulfonate, 10 g of acrylamide, 5 g of methacrylic acid, and 30 g of ethoxymethylmethacrylamide were dissolved in 150 g of distilled water and 150 g of isopropanol at 70° C. and 0.8 g of AIBN was added thereto at 75° C., followed by stirring with heating for 3 hours under nitrogen atmosphere.

After completion of the polymerization, to the resulting dispersion was added distilled water to prepare a 15% solution.

PREPARATION EXAMPLE 11

As in Preparation Example 9, 50 g of sodium 2-acrylamide-2-methylpropanesulfonate, 40 g of N-hydroxymethylacrylamide, 2 g of acrylic acid, and 10 g of styrene were dissolved in 130 g of distilled water, 100 g of ethanol and 50 g of 1,4-dioxane and then, 0.7 g of AIBN was added at 75° C., followed by stirring with heating for 2 hours under nitrogen atmosphere.

Then, the resulting dispersion was diluted with distilled water to obtain a homogeneous solution of 15% in concentration.

PREPARATION EXAMPLE 12

As in Preparation Example 9, 55 g of sodium p-styrenesulfonate, 5 g of 2-acrylamide-2-methylpropanesulfonic acid, 30 g of N-hydroxymethylacrylamide and 10 g of methyl methacrylate were dissolved in 150 g of distilled water and 150 g of methanol and then, 1 g of ammonium persulfate was added thereto at 60° C., followed by stirring at this temperature for 20 hours under nitrogen atmosphere. Thereafter, distilled water was added thereto at room temperature to obtain a solution having a concentration of 15%.

EXAMPLE 7

Each of the samples obtained in Preparation Examples 9-12 and Comparative Preparation Example was coated at a coating film thickness of about 1 micron on both sides of a polyester film subjected to aqueous subbing treatment and was dried. Drying was carried out by heating at 50° C. for 4 hours.

On this film subjected to the antistatic treatment in this way was coated at a coating amount of 5 gm² an emulsion layer prepared by subjecting to desalting treatment a monodispersed silver chlorobromide emulsion having an average particle size of 0.2μ, containing 98 mol % of silver chloride and subjected to usual physical ripening and then adding to this emulsion 5 mg/molAg of pinakryptol yellow as an organic desensitizer, and besides, an aqueous gelatin solution, a hardener, and a surface active agent and then, this coated emulsion layer was dried. The resulting sample was exposed by a roomlight printer and further subjected to development, fixation and washing with water.

Surface resistivity of the side on which emulsion layer was not provided was measured before and after the development and the results are shown in Table 5. The photosensitive materials coated with the samples obtained in Preparation Examples 9-12 had low surface resistivity even after development treatment and thus, good antistatic properties were exhibited. On the other hand, the sample obtained in Comparative Preparation Example contained low proportion of heat curable group and sufficiently cured film was not formed.

TABLE 5

| Antistatic agent | Surface resistivity (Ω) (20° C., 65%) | |
|---|---|---|
| | Before development | After development |
| Preparation Example 9 | $2 \times 10^8$ | $3 \times 10^8$ |
| Preparation Example 10 | $2 \times 10^8$ | $4 \times 10^8$ |
| Preparation Example 11 | $3 \times 10^8$ | $3 \times 10^8$ |
| Preparation Example 12 | $2 \times 10^8$ | $5 \times 10^8$ |

EXAMPLE 8

Each of the samples obtained in Preparation Examples 9-12 was coated at a coating film thickness of about 1 micron on one side of a polyester film subjected to aqueous subbing treatment and was dried.

Thereon was further coated a coating solution comprising an aqueous gelatin solution containing 10% of the same antistatic agent as in the previously coated layer and a hardener and this was dried. On the back side (another side) of the thus obtained film was coated the same emulsion layer as in Example 7 and was dried. This photosensitive material was exposed by a roomlight printer and was subjected to development, fixation and washing with water. Surface resistivity of the antistatic layer was measured before and after the development. The results are shown in Table 6. It can be seen that the antistatic agents obtained in Preparation Examples 9-12 give good antistatic layers excellent in water resistance.

TABLE 6

| Antistatic agent | Surface resistivity (Ω) (20° C., 65%) | |
|---|---|---|
| | Before development | After development |
| Preparation Example 9 | $4 \times 10^9$ | $5 \times 10^9$ |
| Preparation Example 10 | $4 \times 10^9$ | $3 \times 10^9$ |
| Preparation Example 11 | $2 \times 10^9$ | $6 \times 10^9$ |
| Preparation Example 12 | $1 \times 10^9$ | $5 \times 10^9$ |

EXAMPLE 9

To each of the samples obtained in Preparation Examples 9-12 was added 25% in weight ratio of 10% aqueous polyvinyl alcohol solution to obtain a coating solution. In the same manner as in Example 7, this coating solution was coated on a polyester film subjected to aqueous subbing treatment and was dried and furthermore, the same emulsion layer as in Example 7 was provided. Surface resistivity before and after the development was measured to obtain $10^8$ Ω which changed little before and after the development.

PREPARATION EXAMPLE 13

Seventy grams of sodium p-styrenesulfonate, 30 g of N-hydroxymethylacrylamide and 7 g of methacrylic acid were charged in a 500 ml four-necked flask provided with a stirrer, a thermometer, a nitrogen introduction pipe, and a reflux condenser and 150 g of ethanol and 100 g of distilled water were added thereto and dissolution was carried out at 70° C.. Polymerization was initiated by adding 1 g of AIBN at 75° C. under nitrogen atmosphere and stirring was carried out at this temperature for 2.5 hours. The product was a white emulsion and this was thrown into water to obtain a homogeneous polymer solution of 15% in solid content. Molecular weight of the product was about 1,000,000 and viscosity in aqueous solution was 40 cps.

PREPARATION EXAMPLE 14

As in Preparation Example 13, 8 g of polyvinyl pyrrolidone, 55 g of potassium p-styrenesulfonate, 10 g of acrylamide, 5 g of maleic acid and 30 g of ethoxymethylmethacrylamide were dissolved in 150 g of distilled water and 150 g of isopropanol at 70° C. and 0.8 g of AIBN was added thereto at 75° C., followed by stirring with heating for 3 hours under nitrogen atmosphere. After completion of the polymerization, to the resulting dispersion was added distilled water to prepare a 15% solution.

PREPARATION EXAMPLE 15

As in Preparation Example 13, 6 g of polyvinyl alcohol (PVA 203, saponification degree 88%, manufactured by Kuraray Co., Ltd.), 50 g of sodium 2-acrylamide-2-methylpropanesulfonate, 40 g of N-hydroxymethylacrylamide, 2 g of acrylic acid and 10 g of styrene were dissolved in 130 g of distilled water, 100 g of ethanol and 50 g of 1,4-dioxane, and thereto was added 0.7 g of AIBN at 75° C., followed by stirring with heating for 2 hours under nitrogen atmosphere. The resulting dispersion was diluted with distilled water to obtain homogeneous solution of 15% in concentration.

PREPARATION EXAMPLE 16

As in Preparation Example 13, 5 g of polyvinyl alcohol (PVA 105, saponification degree 98.5%, manufactured by Kuraray Co., Ltd.), 55 g of sodium p-styrenesulfonate, 5 g of sodium 2-acrylamide-2-methylpropanesulfonate, 30 g of N-hydroxymethylacrylamide and 10 g of methacrylic acid were added to 150 g of distilled water and 150 g of methanol and then, 1 g of ammonium persulfate was added thereto at 60° C., followed by stirring at this temperature for 20 hours under nitrogen atmosphere. Thereafter, distilled water was added at room temperature to obtain a solution of 15% in concentration.

PREPARATION EXAMPLE 17

Preparation was carried out in the same manner as in Preparation Example 13 except that methacrylic acid was not contained to obtain a homogeneous polymer solution of 15% in solid content.

EXAMPLE 10

Each of the samples obtained in Preparation Examples 13-17 was coated at a coating film thickness of about 1 micron on both sides of a polyester film subjected to aqueous subbing treatment and was dried. Drying was carried out by heating at 50° C. for 4 hours.

On one side of the film subjected to the antistatic treatment in this way was coated gelatin together with a hardener at a dried film thickness of about 3 microns and on another surface was coated 5 gm² of an emulsion layer prepared by subjecting to desalting treatment a monodispersed silver chlorobromide emulsion of $0.2\mu$ in average particle size which contained 98 mol % of silver chloride and which was subjected to usual physical ripening and then adding to the emulsion 5 mg/molAg of pinakryptol yellow as an organic desensitizer, and besides, an aqueous gelatin solution, a hardener, and a surface active agent and then, this coated emulsion layer was dried. The resulting photosensitive material was exposed by a roomlight printer and further subjected to development, fixation and washing with water.

Surface resistivity of the side on which emulsion layer was not provided was measured before and after the development and the results are shown in Table 7. The photosensitive materials coated with the samples obtained in Preparation Examples 13-17 had low surface resistivity even after development treatment and thus, good antistatic properties were exhibited.

In order to evaluate adhesion of the antistatic layer to the film on the side free from the emulsion layer in wet state, the surface was cut in the form of squares of checkerboard and a cellophane tape was applied thereto and then, the cellophane tape was peeled in water under a given load and degree of peeling of the film was measured. The results are shown in Table 7.

TABLE 7

| Antistatic agent | Surface resistivity ($\Omega$) (20° C., 65%) | | Adhesion* |
|---|---|---|---|
| | Before development | After development | |
| Preparation Example 13 | $4 \times 10^8$ | $5 \times 10^8$ | ◯ |
| Preparation Example 14 | $3 \times 10^8$ | $4 \times 10^8$ | ◯ |
| Preparation Example 15 | $3 \times 10^8$ | $7 \times 10^8$ | ◯ |
| Preparation Example 16 | $2 \times 10^8$ | $8 \times 10^8$ | ◯ |
| Preparation Example 17 | $2 \times 10^8$ | $7 \times 10^8$ | ◯~ |

*In evaluation of adhesion, ◯ means that none of the squares were peeled off and means that more than 90% of the squares were not peeled off and remained.

EXAMPLE 11

Each of the samples obtained in Preparation Examples 13-17 was coated at a coating film thickness of about 1 micron on one side of a polyester film subjected to aqueous subbing treatment and was dried. Drying was carried out by heating at 50° C. for 4 hours.

On this layer was further coated a coating solution comprising a hardener and an aqueous gelatin solution containing 10% of the same antistatic agent as in said layer and was dried. On another side of the resulting film was coated the same emulsion layer as used in Example 10 and dried. This was exposed by a roomlight printer and subjected to development, fixation and washing with water. Surface resistivity of the antistatic layer before and after the development was measured.

The results are shown in Table 8. It can be seen that the antistatic agents obtained in Preparation Examples 13-17 give good antistatic layers excellent in water resistance.

Furthermore, in order to evaluate adhesion to the film, the same evaluation of adhesion as in Example 10 was conducted and the results are shown in Table 8.

TABLE 8

| Antistatic agent | Surface resistivity ($\Omega$) (20° C., 65%) | | Adhesion* |
|---|---|---|---|
| | Before development | After development | |
| Preparation Example 13 | $6 \times 10^8$ | $7 \times 10^8$ | ◯ |
| Preparation Example 14 | $4 \times 10^8$ | $5 \times 10^8$ | ◯ |
| Preparation Example 15 | $4 \times 10^8$ | $6 \times 10^8$ | ◯ |
| Preparation Example 16 | $2 \times 10^8$ | $3 \times 10^8$ | ◯ |
| Preparation Example 17 | $4 \times 10^8$ | $9 \times 10^8$ | ◯~ |

*Criteria for evaluation of adhesion are the same as in Table 7.

PREPARATION EXAMPLE 18

Sixtyfive grams of sodium p-styrenesulfonate, 30 g of N-hydroxymethylacrylamide and 5 g of methacrylic acid were charged in a 500 ml four-necked flask equipped with a stirrer, a thermometer, a nitrogen introduction pipe, and a reflux condenser and thereto were added 100 g of distilled water and 150 g of ethanol, followed by heating at 70° C.. Polymerization was initiated by adding 1 g of AIBN under nitrogen atmosphere and stirring was carried out with heating for 3 hours. Thereafter, ethanol was removed by distillation under reduced pressure and distilled water was added to obtain a homogeneous aqueous solution containing 18% by weight of the polymer produced.

PREPARATION EXAMPLE 19

As in Preparation Example 18, 150 g of distilled water and 150 g of ethanol were added to 7 g of polyvinyl pyrrolidone, 15 g of styrene, 30 g of N-ethoxymethylmethacrylamide, and 53 g of sodium 2-acrylamide-2-methylpropanesulfonate and polymerization was carried out at 75° C. to obtain a resin dispersion. After completion of the polymerization, water was further added to obtain a solution having a concentration of 18% by weight.

PREPARATION EXAMPLE 20

As in Preparation Example 18, 7 g of polyvinyl alcohol (PVA 203, manufactured by Kuraray Co., Ltd.), 40 g of methacrylic acid, 33 g of N-hydroxymethylmethacrylamide and 20 g of methyl methacrylate were added and besides, 500 g of distilled water was added. Thereto was added dropwise 10% sodium hydroxide to adjust pH of the system to 7 and polymerization was carried out to obtain a stable dispersion. Water was added to the resulting dispersion to prepare a solution of 15% by weight in concentration.

PREPARATION EXAMPLE 21

As in Preparation Example 18, 150 g of distilled water and 200 g of isopropanol were added to 6 g of polyvinyl pyrrolidone, 70 g of acrylamide, 30 g of N-hydroxymethylacrylamide, and polymerization was carried out at 75° C.. Water was added to the resulting dispersion to prepare a solution of 15% by weight in concentration.

EXAMPLE 12

Sulfuric acid was added to the solutions obtained in Preparation Examples 18-21 to adjust pH of the solutions to 2.0 and 3.5 to prepare coating solutions. In order to evaluate storage stability, the solutions were stored for 15 days under heating at 50° C.. It was confirmed that there was no change in viscosity of the solutions before and after stored and the solutions were stable. For comparison, the solution obtained in Preparation Example 18 was concentrated to 25% by weight. This showed much increase in viscosity after stored and was not able to be practically used.

Further, each of the coating solutions obtained in Preparation Examples 18-21 and adjusted to a pH of 2.0 and 3.5 was coated at a thickness of 1 micron (dried) on a polyester film subjected to aqueous subbing treatment and dried at 50° C. for 2 hours. Thereafter, the coated and dried film was dipped in a warm water of 40° C. and left to stand for 5 hours. The coated film showed no change and was very excellent in water resistance.

Moreover, for comparison, the solutions obtained in Preparation Examples 18-21 were adjusted to a concentration of 15% by weight and adjusted to a pH of 4.5 to obtain coating solutions. These were superior in storage stability, but when each of them was coated and dried in the same manner as above and water resistance thereof was evaluated as above, the film was dissolved with warm water and sufficient water resistant film was not obtained.

EXAMPLE 13

Similarly, all of the resin solutions obtained in Preparation Examples 18-21 were adjusted to a pH of 2.5 and a concentration of 15% by weight and were stored for 3 weeks under heating at 50° C.. Then, each of them was coated on a polyester film in the same manner as above and dried at 50° C. for 5 hours. The film coated with the solution was washed with warm water of 50° C. for about 10 minutes and surface resistivity before and after washing with water was measured to obtain the results as shown in Table 9. In all cases, the surface resistivity did not change before and after washing with water and this indicates that a film layer having water resistance and hydrophilicity was formed.

TABLE 9

| Samples | Concentration | pH | Viscosity Before stored | Viscosity After stored* | Surface resistivity (Ω) Before water washing | Surface resistivity (Ω) After water washing** |
|---|---|---|---|---|---|---|
| Preparation Example 18 | 15.0 | 2.5 | 40 | 41 | $1 \times 10^7$ | $2 \times 10^7$ |
| Preparation Example 19 | 15.0 | 2.5 | 35 | 36 | $4 \times 10^7$ | $5 \times 10^8$ |
| Preparation Example 20 | 15.0 | 2.5 | 90 | 91 | $1 \times 10^7$ | $3 \times 10^7$ |
| Preparation Example 21 | 15.0 | 2.5 | 80 | 80 | $4 \times 10^{10}$ | $6 \times 10^{10}$ |

*After stored for 3 weeks at 50° C.
**After washed with warm water of 50° C. for 10 minutes.

The antistatic agent of the present invention is excellent in water resistance and gives antistatic properties having superior antistatic action even after photographic treatments of photographic materials when it is applied to photographic materials. By applying the agent to film photosensitive materials, various troubles caused by generation of static electricity before and after development can be solved.

What is claimed is:

1. An antistatic layer comprising:

a support;

a layer containing a curable antistatic polymer dispersion; and a layer containing gelatin, said layers being provided on the support in this order or in the reverse order and said layers being contiguous to each other, wherein said curable antistatic polymer is obtained by the method comprising the steps of polymerizing a mixture of polymerizable monomer components comprising;

40 to 90 percent by weight, relative to the total weight of the polymerizable monomer components, of a polymerizable vinyl monomer (I) having a sulfonic acid group or a salt thereof as a substituent; and 10 to 60 percent by weight, relative to the total weight of the polymerizable monomer components, of a monomer (II) represented by the following formula (II)

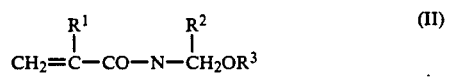

wherein $R^1$ and $R^2$ each represents a hydrogen atom or a methyl group and $R^3$ represents a hydrogen atom or an alkyl group of 1 to 8 carbon atoms; or a mixture of 40 to 90 percent by weight, relative to the total weight of the polymerizable momomer components, of monomer (I) and 10 to 60 percent by weight, relative to the total weight of the polymerizable monomer components, of monomer (II) and 1 to 30 percent by weight, relative to the total weight of the polymerizable monomer components, of an additional polymerizable monomer component which is copolymerizable with monomer (I) and monomer (II);

wherein said polymerization takes place in a solvent system selected from a water-miscible organic solvent and a mixed solvent comprising a water-miscible organic solvent and water.

2. An antistatic layer according to claim 1, wherein the layer containing gelatin is provided on the curable antistatic polymer dispersion, the two layers being contiguous.

3. An antistatic layer according to claim 1, wherein the additional polymerizable monomer component is selected from polymerizable monomers which have an acidic group and a polymerizable double bond.

4. An antistatic layer according to claim 3, wherein the additional polymerizable monomer component is selected from (meth)acrylic acid, crotonic acid, maleic acid, 2-acrylamide-2-methylpropanesulfonic acid and vinylsulfonic acid.

5. An antistatic layer according to claim 1, wherein the curable antistatic polymer comprises 40% by weight of the polymerizable vinyl monomer (I), relative to the combined weight of all of the polymerizable monomers, and at least 10% by weight of the monomer (II), relative to the combined weight of all of the polymerizable monomers.

6. An antistatic layer according to claim 1, wherein the polymerizable vinyl monomer (I) is selected from p-styrenesulfonic acid, its alkali metal salts, its ammonium salt, 2-acrylamide-2-methylpropanesulfonic acid, its alkali metal salt, its ammonium salt, its neutralized salt with an organic amine, and sodium 2-sulfoethyl-(meth)acrylate.

7. An antistatic layer according to claim 1, wherein the polymerization takes place in a mixed solvent comprising water and a water-miscible organic solvent.

8. An antistatic layer according to claim 7, wherein the water miscible organic solvent is an alcohol, and is present at a concentration of at least 40%.

9. An antistatic layer according to claim 1 or 7, wherein the water-miscible solvent is selected from an alcohol, a ketone, dioxane and tetrahydrofuran.

10. An antistatic layer according to claim 9, wherein the mixed solvent contains a resin, which is soluble in said solvent, as a dispersion stabilizer.

11. An antistatic layer according to claim 10, wherein the resin is present in an amount of 10% by weight or less, relative to the combined weight of all polymerizable monomers.

12. An antistatic layer according to claim 10, wherein the resin is selected from the group consisting of polyvinyl pyrrolidone, polyvinyl acetate, partially saponified polyvinyl acetate, polyvinyl alcohol, and poly(meth)acrylic acid.

13. An antistatic layer according to claim 1, wherein monomer (II) is selected from hydroxymethyl(meth)acrylamide, ethoxymethyl(meth)acrylamide, and butoxymethyl(meth)acrylamide.

* * * * *